United States Patent [19]

Crowley et al.

[11] 4,236,667

[45] Dec. 2, 1980

[54] LOW INSERTION FORCE CARD READER

[75] Inventors: Daniel J. Crowley, Harrisburg; Jon D. Stine, Elizabethtown, both of Pa.

[73] Assignee: AMP Incorporated, Harrisburg, Pa.

[21] Appl. No.: 59,352

[22] Filed: Jul. 20, 1979

[51] Int. Cl.³ .................. G06K 7/06; G06K 13/20; G06K 13/24

[52] U.S. Cl. .................. 235/443; 235/479; 235/482

[58] Field of Search .................. 235/479, 482, 443

[56] References Cited

U.S. PATENT DOCUMENTS

| | | | |
|---|---|---|---|
| 3,308,252 | 3/1967 | Rosen | 235/479 |
| 3,433,932 | 3/1969 | Rolke | 235/479 |
| 3,492,447 | 1/1970 | McFadden | 235/443 |
| 3,591,773 | 7/1971 | Collier et al. | 235/432 |
| 3,627,994 | 12/1971 | Sallach et al. | 235/479 |

Primary Examiner—Daryl W. Cook

Attorney, Agent, or Firm—Richard B. O'Planick

[57] ABSTRACT

A low insertion force, handfed card reader is disclosed comprising a housing having a profiled passageway therein opening to a frontal side. The passageway is defined by a top wall having an array of contacts mounted therein, and a bottom wall slanted downwardly from a backward end of the passageway toward the frontal opening. A tray is provided within the passageway having a like-slanted bottom surface which is positioned against the bottom wall of the passageway. An encoded card can be freely inserted into the passageway a distance onto the tray, and as the tray is slid backward along the bottom wall, the encoded card is thereby moved upwardly against the contacts. A profiled retention spring system is further provided and pressures the encoded card against the top surface of the passageway to maintain the card reader in its read-mode until subsequently released by the user.

12 Claims, 6 Drawing Figures

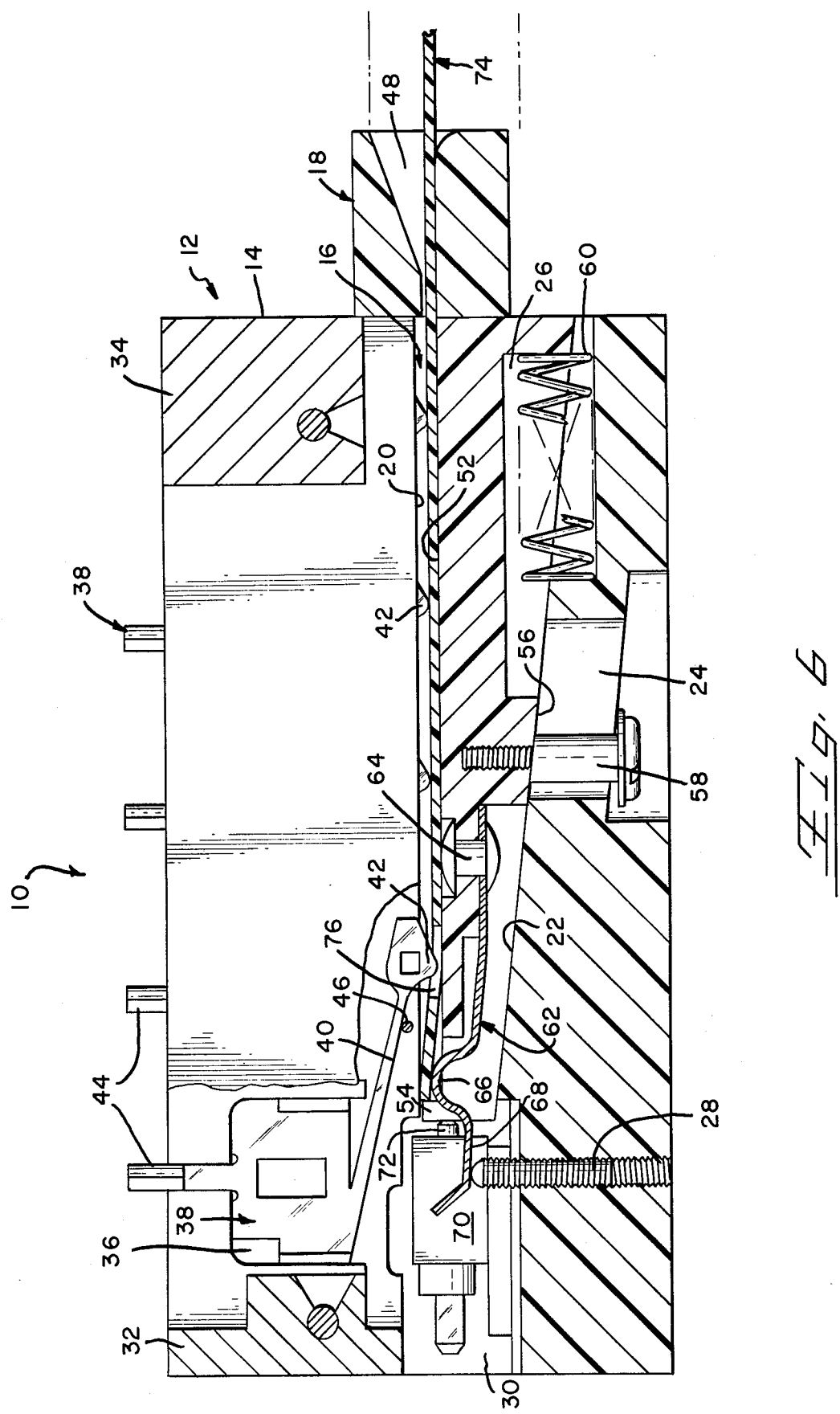

LOW INSERTION FORCE CARD READER

BACKGROUND OF THE INVENTION

1. Field of the Invention

This invention relates to handfed card readers. More particularly, the invention pertains to low insertion force card readers having continuous read-mode retention means.

2. The Prior Art

Demand for card readers has grown in recent years as many new applications become apparent. For example, card readers are increasingly employed as substitutes for coinactuated mechanisms in vending machines, turnstiles, and the like; access to many buildings often is controlled by card reader security systems; and many offices now use machines which can only be activated upon card reader command. As rapid as this growth has been, however, certain problems and deficiencies existing in present card readers must be overcome if progress is to be sustained.

In particular, the industry is in need of a single, economically-produced card reader which can be used in a variety of applications. Such a card reader must be rugged and capable of withstanding many duty cycles without excessive wear. As a corallary to this requirement, any proposed design must minimize contact wear to prolong the useful life of the card reader and reduce replacement expense. Further, the card reader must be convenient to operate, preferably by hand, so as to be operable by all types of users without supervision or assistance. The card reader also should have a positive card retention system since, for many applications, the read-mode must be sustained throughout the performance of the controlled device. Finally, the ideal card reader, for commercial reasons, must have a minimal number of parts, be simple in design, and be inexpensive to manufacture.

Herefore, no card reader had been achieved which could entirely satisfy the above-mentioned demands. Many card readers employ a technique whereby an encoded card is inserted beneath a reading head and contacts, in wiping fashion, the contact members therein. This wiping action not only wears the contact tips, but with time, destroys the card surface. Other card readers, the so called zero or low insertion force versions, utilize various methods for indirectly bringing the card and the reading head into proper reading orientation. One such approach is taught by U.S. Pat. No. 3,573,434, which discloses a lever-actuated spring toggle mechanism for lowering the reading head to the card. While this reader works well, it is relatively complicated to assemble and requires substantial manual force to operate. Also, by bringing the reading head to the card there is a greater likelihood of losing precision alignment between the card and the reading contacts.

SUMMARY OF THE INVENTION

The subject invention comprises a card reader housing having a profiled passageway therein opening to a frontal side. The passageway is defined by a top wall having an array of contacts mounted therein, and a bottom wall slanted downward from a backward end of the passageway toward the frontal opening. A tray is provided within the passageway having a slanted bottom surface positioned against the passageway bottom wall. An encoded card can be freely inserted into the passageway and onto the tray, and as the tray is moved backwardly along the bottom wall, the encoded card moves upwardly against the contacts within the top wall of the passageway. A retention spring system is further provided to pressure the encoded card upwards against the top surface of the passageway to trap the encoded card in a read-mode until subsequently released by the user.

Accordingly, it is an object of the present invention to provide a card reader capable of accepting a card with low insertion force required of the user.

A further object is to provide a card reader which can bring an encoded card into engagement against reading contacts, yet minimize wiping, frictional contact between the contacts and the card.

Still a further object is to provide a card reader having positive retention means for maintaining the card beneath the reading head in a reading relationship until such read-mode is released by the user.

A still further object of the present invention is to provide a ruggedized card reader having a relatively long life span.

Further, it is an object of the present invention to provide a card reader which is readily and economically produced.

These and other objects, which will be apparent to one skilled in the art, are achieved by a preferred embodiment which is described below in detail, and which is illustrated in the accompanying drawings.

BRIEF DESCRIPTION OF THE ACCOMPANYING DRAWINGS

FIG. 6 is a side elevation view in section of the subject card reader at the end of the insertion sequence, taken along the line 6—6 of FIG. 3.

DETAILED DESCRIPTION OF THE PREFERRED EMBODIMENT

Figure 1:
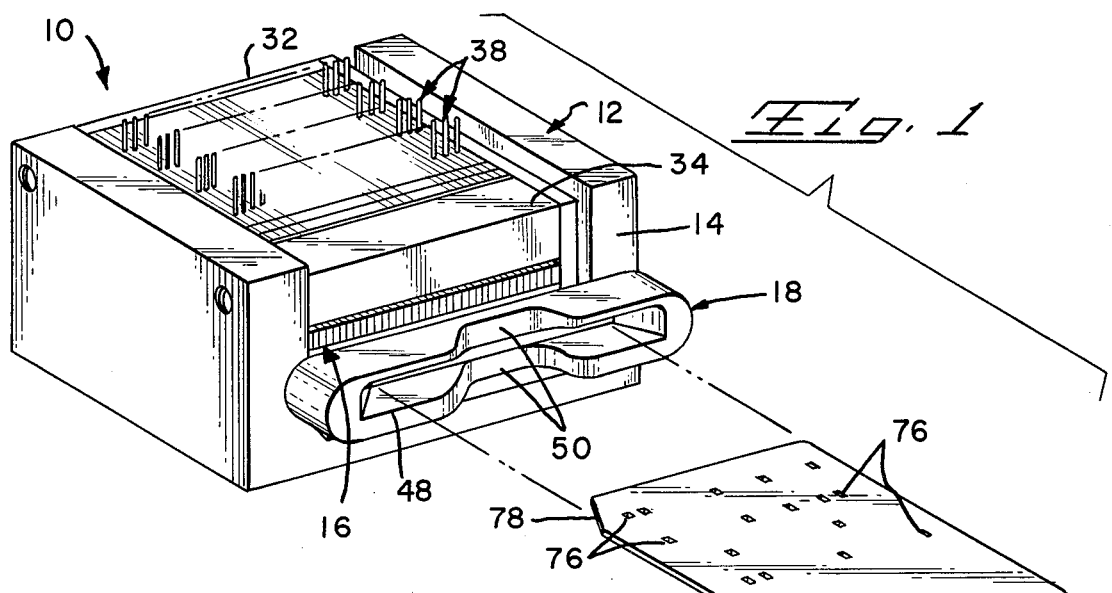
FIG. 1 is an exploded perspective view of the present invention showing the subject card reader having an encoded card exploded therefrom.
Figure 2:
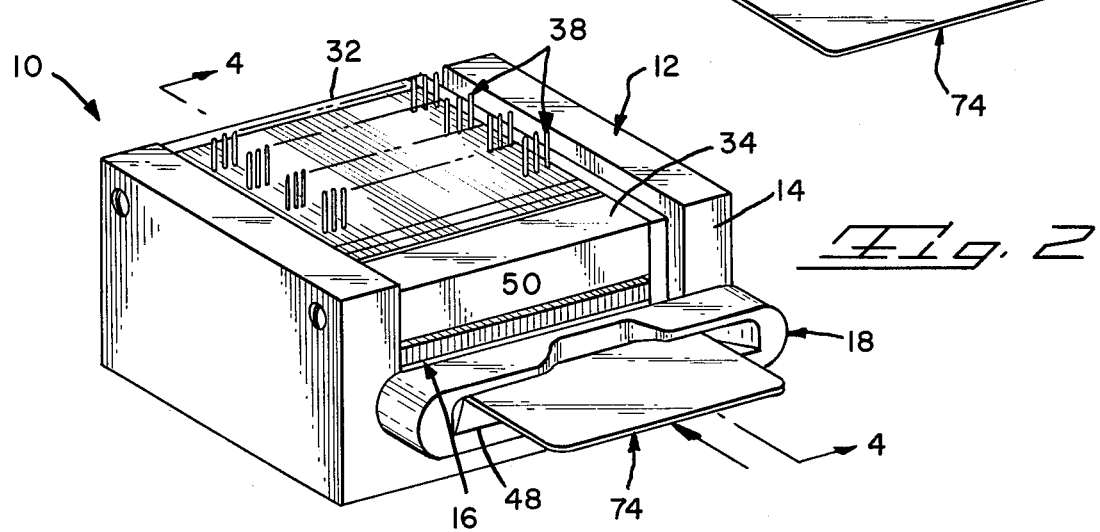
FIG. 2 is a perspective view of the subject card reader subsequent to the insertion of the encoded card therein.
Figure 4:
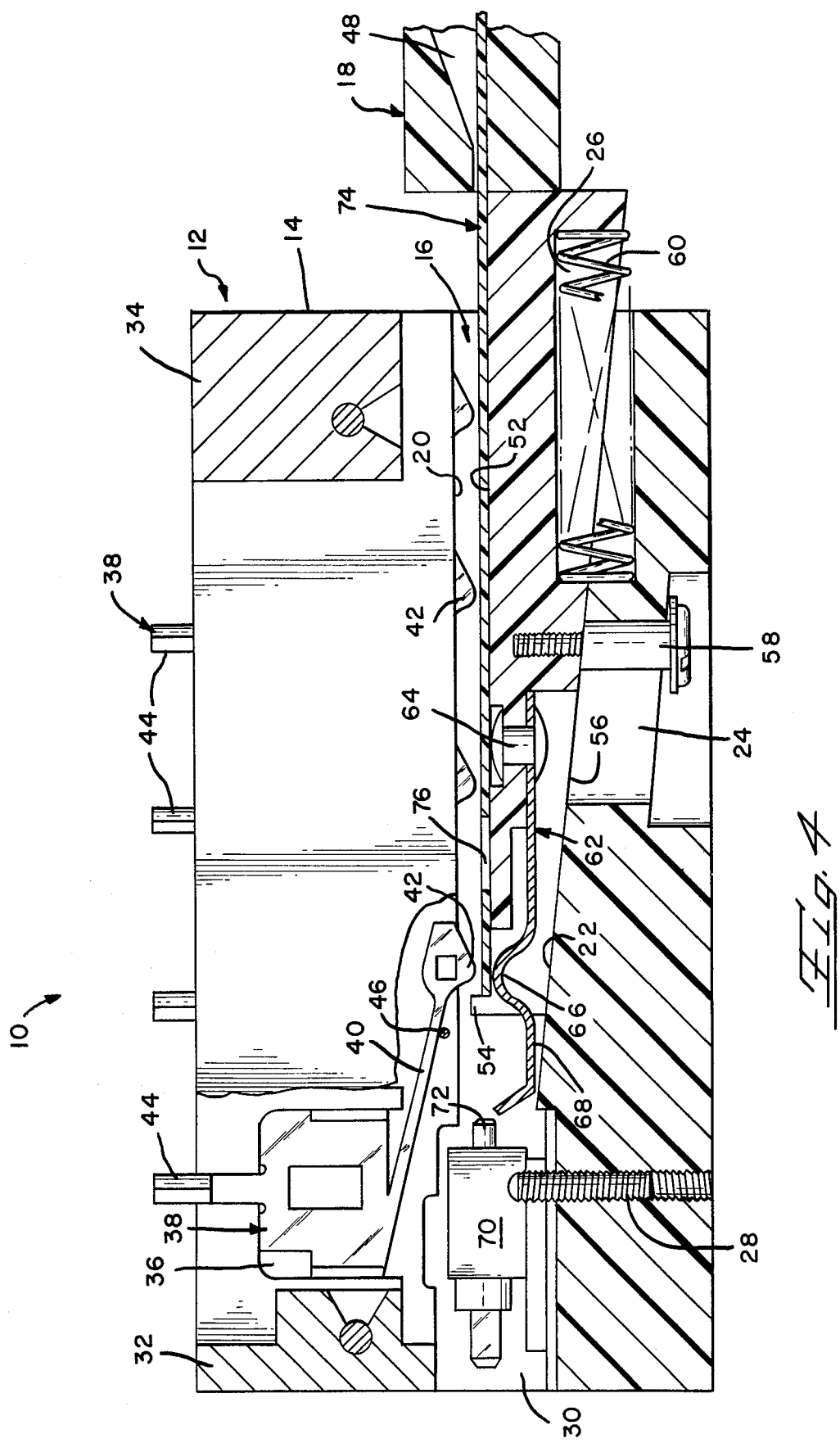
FIG. 4 is a side elevation view in section of the subject card reader illustrated in FIG. 2, taken along the line 4—4.

Referring first to FIGS. 1 and 4, the subject card reader 10 is shown to comprise a housing 12 having a forward face 14, and a passageway 16 projecting into the face 14. A card transporting tray 18 is further provided within the passageway 16. As shown in FIG. 4, the passageway 16 is defined by a top wall 20 and a bottom wall 22 adaptably slanted downward and towards the housing forward face 14. The housing 12 has a screw slot 24 formed therein to longitudinally extend a distance within the bottom of the housing. Rearward in the housing 12 is a deflection screw projecting upwardly into a rearward chamber 30 of the passageway 16. At the rearward end of the housing is a spacer block 32, and a forward spacer block 34 is provided generally forward in the housing. Continuing, a plurality of cavities 36 are provided within the top of the housing 12, each adapted to receive a contact member 38 therein (only one of which being shown). Each contact member 38 comprises a downwardly projecting cantilever arm 40 having a remote profiled tip 42, and an upward post portion 44 projecting externally of the housing 12. It will be appreciated that the post portions 44 provide an interface to decoding circuitry (not shown). As shown in FIG. 4, each cantilever contact arm 40 normally rests against a contact wire 46 extending transversely of the housing 12 in what, for reference purposes, represents the "closed" position.

With continued reference to FIGS. 1 and 4, the tray 18 is shown to comprise a slotted entrance portion 48 having digital recesses 50 formed therein, a planar top surface 52 extending from the entrance portion 48 to a card stopping lip 54, and a bottom surface 56 adapted to slant downwardly toward the housing face 14. A set screw 58 extends into a bottom surface of the tray, and resides within the screw slot 24 of the housing 12. Further provided is a biasing spring 60 within the spring slot 26 for forwardly biasing the tray 18. Continuing, the tray 18 has a serpentine-profiled cantilever spring 62 fastened within a bottom channel thereof by means of a fastening rivot 64. The spring 62 includes an inverted-U-shaped midportion 66 and a U-shaped rearward portion 68 projecting rearward of the tray 18. The upper surface of the midportion 66 is normally coplanar with the top surface 52 of the tray 18.

As shown in FIG. 4, a switch 70 is located within the rearward chamber 30 of the passageway, and presents a forwardly directed actuator button 72 at the rearward end of the passageway 16. It will be appreciated that, through external connections (not shown), the switch 70 can be connected via appropriate circuitry so as to control the electrical status of the contacts 38.

Figure 5:
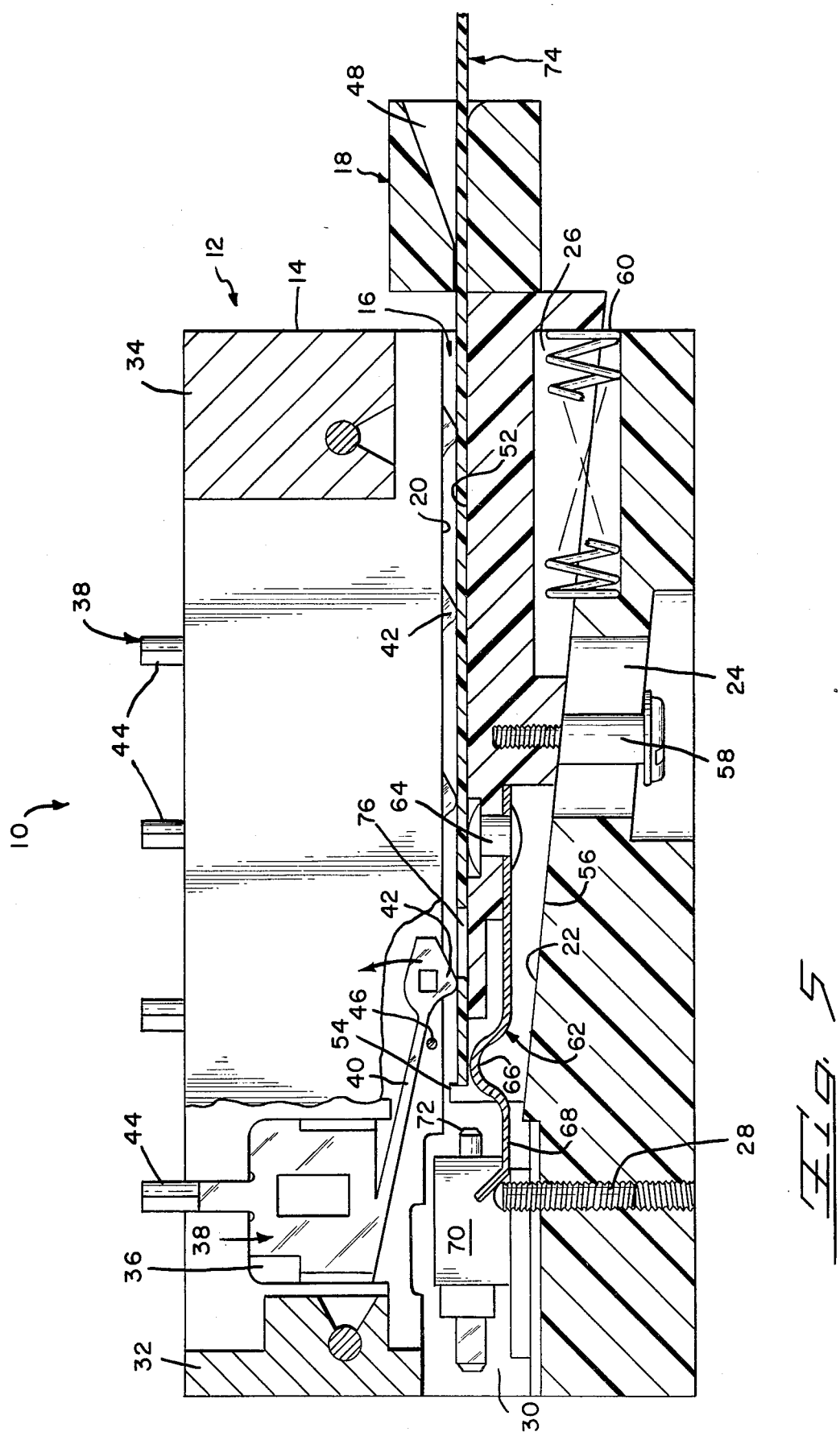
FIG. 5 is a side elevation view of the subject card reader at an intermediate point in the insertion sequence.

Referring now to FIGS. 1 and 4, the subject invention is intended to read a card 74 having an encoded arrangement of apertures 76 therein, and an orientation beveled edge 78. Use of the card reader 10 procedes as follows. The card 74 is inserted through the slotted entrance way 48, onto the top surface 52 of the tray 18, and against the card stop 54. It will be noted that insertion is freely achieved, as no contact between the contact tips 42 and the card has occurred through this point in the operating sequence. As the card 74 and the tray 18 are inserted rearwardly into the passageway 16, the bottom surface 56 of the tray 18 rides the bottom wall 22 of the passageway upwards, and the card 74 engages the contact tips 42. This engagement is illustrated by FIG. 5. The force of engagement against the card causes the contact arms 40 to resiliently swing upwards and out of contact with the transverse wires 46, thereby "opening" the contact. This deflection of the contact arms will continue as the card is further inserted into the passageway so long as no aperture is encountered by the contact tips 42.

Figure 3:
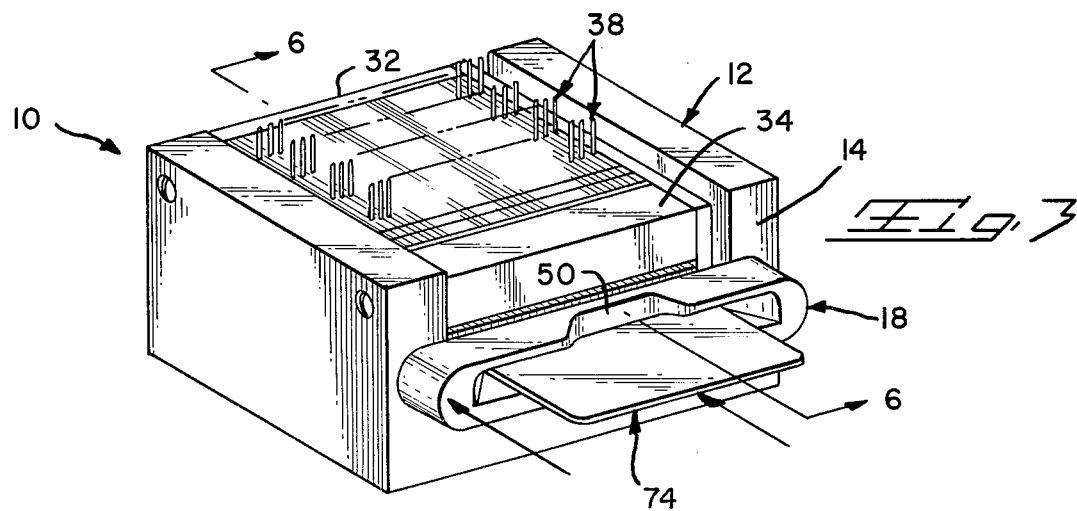
FIG. 3 is a perspective view of the subject card reader at the end of the insertion sequence.

Referring now to FIGS. 3 and 6, the final insertion of the card and tray into the passageway effectuates engagement between the cantilever spring rearward portion 68 and the deflection screw 28. The spring midportion 66 and the rearward portion 68 are thereby deflected upwards, and the midportion 66 pressures a forward end of the card 74 against the top wall 20 of the passageway. The frictionally engaged spring midportion 66, card end, and top wall 20 establish a static equilibrium and trap the tray and card in the inserted position. As the tray reaches the inserted position illustrated by FIG. 6, further contact is established between the card 74 and the actuator button 72 of the switch 70. This engagement actuates the card reader switch which signals the beginning of the read-mode to external circuitry (not shown), said circuitry being likewise connected to the contact posts 44. By the time the card is fully inserted, those contact tips 42 having encountered apertures 76 resiliently fall therein to reestablish contact between their respective cantilever arms 40 and the corresponding transverse contact wires 46. The detection of apertures is then relayed to the external decoding circuitry mentioned above. It should be noted that the read-mode is continuous so long as the card and tray are trapped, and the actuator button 72 is continuously held "on". Appropriate pre-adjustment of the deflection screw set will insure the achievement and preservation of proper tension between the spring 62, card 74, and the passageway top wall 20. The static equilibrium achieved between the spring 62, card 74, and top wall 20 can be subsequently overcome by a slight outward pull on the tray entranceway 48 and the card.

It will be appreciated that the operation of the subject card reader requires low insertion force since the card is substantially completely inserted before encountering resistance. Also, the contacts and the card do not engage until the final insertion path is traversed. Thus, frictional wiping contact is minimized to preserve the life of the unit. It should be noted that, while mechanical contacts are shown in the accompanying drawings, the principles of the subject invention would have application in other systems, such as optical readers or the like.

While the above description of the preferred embodiment exemplifies the principles of the subject invention, other embodiments which will be apparent to one skilled in the art and which utilize the teachings herein set forth are intended to be within the scope and spirit of the subject invention.

What is claimed is:

1. A card reader for reading an encoded card, said card reader comprising:
    a housing having a profiled passageway therein having an opening to a frontal side of the housing, said passageway being defined by a top wall having card reading means therein, and bottom guide means slanted downward from a backward region of said passageway toward said frontal opening;
    transporting means receivable within said passageway having a complimentarily slanted bottom surface for engagement with said slanted passageway bottom guide means, and having a top surface receiving the card thereon and being displaced a distance below said passageway top wall at said passageway opening, and said transporting means being moveable backwardly and upwardly into said passageway along said passageway bottom guide means toward said backward region, whereby,
    the encoded card upon said transporting means top surface is transposed toward said passageway top wall and into a reading relationship with said card reading means in said top wall.

2. A card reader as set forth in claim 1, said card reader further comprising retaining means for holding said transporting means and the card thereon within said passageway at said backward region with the encoded card and said reading means in said reading relationship.

3. A card reader as set forth in claim 2, wherein said retaining means comprising:
   a generally serpentine-profiled cantilever spring member having a forward end secured within said transporting means top surface, an inverted U-shaped middle portion having an upper surface normally coplanar with said transporting means top surface, and a U-shaped rearward portion projecting rearward beyond a rearward end of said transporting means; and
   deflecting means located at said backward region of said passageway projecting upwards into said passageway, whereby, upon said movement of said transporting means backwards in said passageway, said spring member forward portion engages said deflecting means and is deflected upwards, thereby moving said spring member middle portion upwards to pressure the card against said passageway top wall.

4. A card reader as set forth in claim 1, said card reader further comprising reading-mode switching means at said backward region of said passageway responsive to the presence of said card at said backward region.

5. A card reader as set forth in claim 1, said transporting means being reciprocally moveable in forward and backward directions along said bottom passageway guide means, said reader further comprising means for biasing said transporting means in said forward direction.

6. A card reader as set forth in claim 1, said bottom guide means comprising a bottom wall defining said card reader passageway.

7. A card reader as set forth in claim 1, said transporting means comprising a tray having a forward slotted entry portion receiving the card therethrough in an aligned orientation, and backward card stopping means receiving a front end of said card in abutment thereagainst.

8. A card reader as set forth in claim 1, wherein said housing having means engaging said transporting means for preventing removal of said transporting means from said passageway opening.

9. A card reader as set forth in claim 1, wherein said reading means comprising a plurality of resilient contact arms each having a remote tip projecting from said passageway top wall downwardly into said passageway.

10. A card reader for reading an encoded card, comprising:
    a housing having a profiled passageway therein having an opening to a frontal side of the housing, said passageway being defined by a top wall having card reading means therein, and a bottom wall slanted downward from a backward region of said passageway toward said frontal opening;
    a transporting tray receivable within said passageway having a complimentarily slanted bottom surface for engagement with said slanted passageway bottom wall, and having a top surface receiving the card thereon and being displaced a distance below said passageway top wall at said passageway opening, and said transporting tray being moveable backwardly into said passageway along said passageway bottom wall, whereby,
    the encoded card is transposed upwardly toward said passageway top wall and into a reading relationship with said reading means in said top wall.

11. A card reader as set forth in claim 10, further comprising:
    a cantilever spring member having a forward end secured to said transporting tray, a middle portion coplanarly within said tray top surface, and a rearward portion projecting rearward beyond a rearward end of said tray; and
    deflecting means located at said backward region of said passageway and projecting upwards into said passageway, whereby,
    upon movement of said transporting tray backwards in said passageway, said spring member rearward portion engages said deflecting means and is deflected upwards, thereby moving said spring member middle portion upwardly under tension to pressure the card against said passageway top wall.

12. A card reader as set forth in claim 11, further comprising reading-mode switching means at said backward region of said passageway for activating said card reader, said switching means having actuating means responsive to the presence of said card at said backward region.

* * * * *